United States Patent Office 3,479,133
Patented Nov. 18, 1969

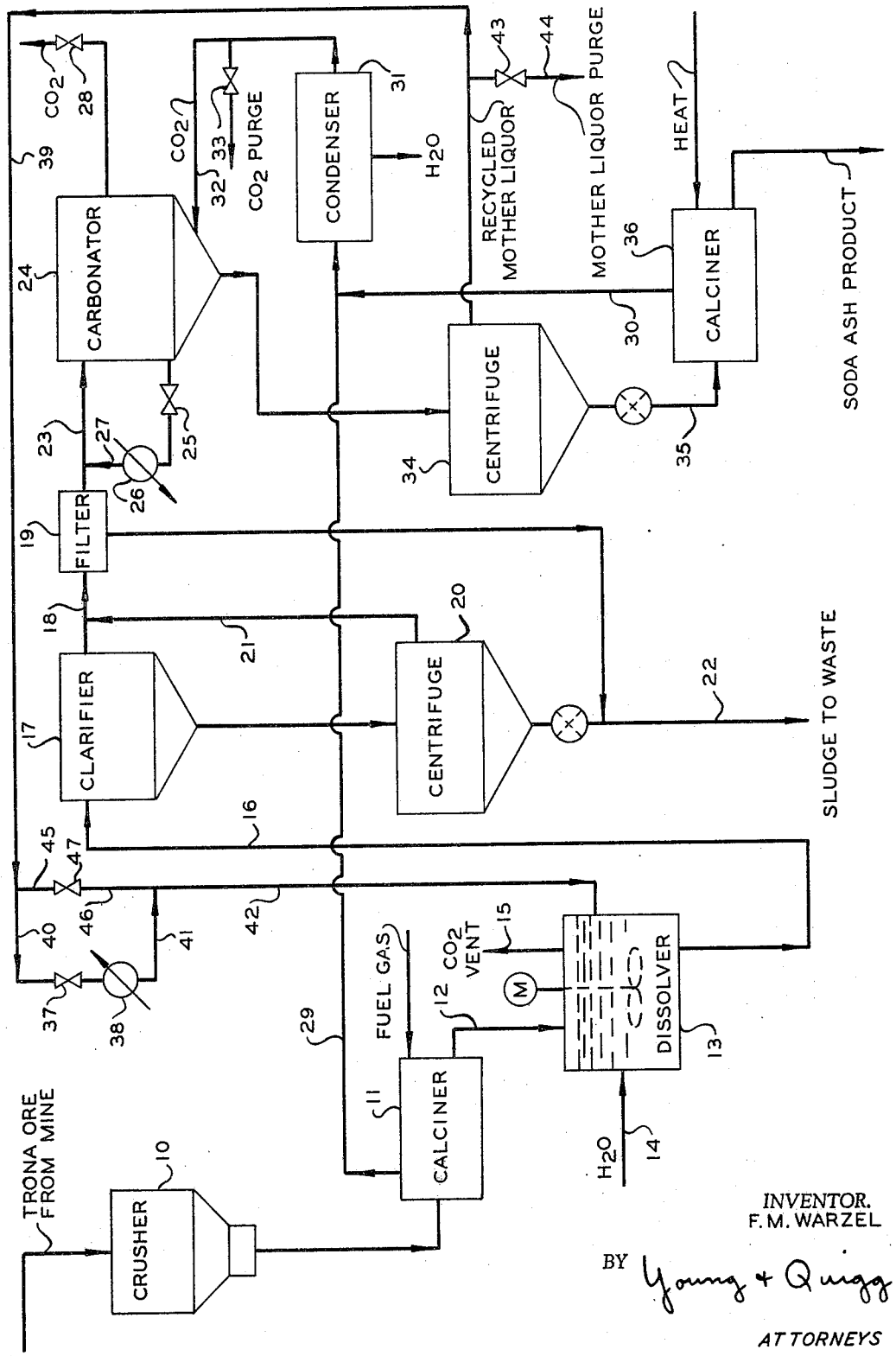

3,479,133
PRODUCTION OF SODA ASH FROM TRONA
Fred M. Warzel, Bartlesville, Okla., assignor to Phillips Petroleum Company, a corporation of Delaware
Filed Jan. 19, 1967, Ser. No. 610,421
Int. Cl. C01d 7/10
U.S. Cl. 23—63                                    8 Claims

ABSTRACT OF THE DISCLOSURE

A method for producing soda ash from natural crude trona ore including the following steps: crushing crude trona ore into granules, calcining the crushed crude trona at an elevated temperature to form sodium carbonate and to remove organic materials, dissolving the calcined trona in liquid recycled from the process and make-up water, clarifying and filtering the resulting solution to remove insolubles, adding carbon dioxide to the resulting solution to precipitate sodium sesquicarbonate crystals therefrom, separating the sodium sesquicarbonate crystals from the liquid from which the crysals have precipitated, recycling the liquid to the dissolution step and calcining the separated sesquicarbonate crystals to produce a soda ash product.

This invention relates to the economical production of soda ash from crude dry-mined trona.

The pure mineral trona has the empirical formula $Na_2CO_3 \cdot NaHCO_3 \cdot 2H_2O$ and is commonly called sodium sesquicarbonate. When sodium sesquicarbonate is calcined at relatively low temperatures, water and carbon dioxide are released and soda ash ($Na_2CO_3$) is formed. Natural trona, particularly that mined from beds located in the Green River, Wyoming, area contains impurities which prevent direct production of soda ash for most commercial uses without some type of treatment prior to calcination to the finished product.

One prior art method for producing soda ash from crude trona involves dissolving the crude trona in a mother liquor, treating the trona solution with an adsorbent, clarifying and filtering the solution, crystallizing sodium sesquicarbonate from the solution in a series of vacuum crystallizers, and then calcining the sesquicarbonate crystals to soda ash.

The above prior art method has some inherent problems associated with the use of a solution of crude trona. The primary problem associated with the use of such a solution is that it contains organic contamination. The presence of organic contamination in the soda ash product is undesirable because of a resultant yellowish discoloration which makes the soda ash unusable for many commercial applications. To remove this organic and coloring matter, this prior art method includes a treatment of the solution by an adsorbent material, such as activated carbon. This carbon is removed by filtration and usually requires the addition of a filter aid to ensure that all the carbon is filtered out and to obtain acceptable filtering rates. Even with the treatment by a decolorizing agent, the product is not as white as soda ash produced by other methods. Resultant operating cost and control problems associated with the addition of the adsorbent material are obvious.

Another prior art method for producing soda ash from crude trona involves calcining the crude trona, dissolving the calcined trona in water, clarifying and filtering the solution, evaporating a portion of the water from the solution to produce sodium carbonate monhydrate crystals, and calcining the sodium carbonate monohydrate crystals to soda ash.

This latter prior art method produces a dense soda ash with relatively high purity; however, the evaporation step is relatively expensive because large quantities of low pressure steam are required. Also, considerable quantities of water must be added to this system, even if the water from the evaporators is condensed and recycled, because of evaporation from the equipment, leaks, etc. The amount of water required is of primary importance in arid regions like the one where the trona beds are located in Wyoming.

Accordingly, an object of this invention is to provide a process for producing a substantially organic-free soda ash from crude trona without the use of a crude trona solution.

Another object of this invention is to avoid the use of a decolorizing agent in the production of soda ash from crude trona while still obtaining a substantially organic-free product.

A further object of this invention is to provide a process for producing organic-free soda ash from crude trona in an efficient and economical manner without the use of an evaporation step.

Further objects and adavntages of this invention will become apparent to those skilled in the art from the following detailed description.

Generally stated, the process of this invention comprises crushing the crude trona, calcining the crude trona to form sodium carbonate and to remove organic materials, dissolving the calcined trona in mother liquor and water, clarifying and filtering the solution to remove insolubles, carbonating in a closed vessel and cooling the solution to precipitate sodium sesquicarbonate crystals therefrom, separating the sodium sesquicarbonate crystals from the mother liquor, recycling the mother liquor to the dissolver and calcining the sodium sesquicarbonate crystals to form soda ash.

In this invention crude trona is heated to convert the sodium bicarbonate present therein to sodium carbonate as represented by the reaction:

$$2(Na_2CO_3 \cdot NaHCO_3 \cdot 2H_2O) \rightarrow 3Na_2CO_3 + 5H_2O + CO_2$$

Calcining the crude trona prior to dissolution is advantageous for several reasons. As discussed previously, crude trona solutions contain organics which discolor the soda ash product, if not removed, so treatment with a decolorizing agent is required. Solutions of calcined trona do not require this treatment since the organic materials in the crude trona are substantially burned off during calcination. Calcined trona has a greater rate of solubility than crude trona thereby reducing the dissolving equipment size and time cycle and increasing soda ash production rate. Also, the concentration of soluble impurities is somewhat less in a solution of calcined trona than a solution of crude trona.

The crude trona from the mine can be prepared for calcining by crushing the ore and screening to obtain granules in the 4 to 20 mesh screen size range. Proper sizing of the trona granules is important in order to obtain maximum surface area exposure, and to ensure that the oxygen diffuses into the ore granules and oxidizes the nonvolatile materials; hence, adequate decomposition of organics and good conversion of sodium bicarbonate to sodium carbonate.

In order to adequately remove the organic materials from the crude trona ore in the 4 to 20 mesh screen size range in a resonable time, a calciner temperature of approximately 950 to 1150° F. can be used. At this temperature the retention time in the calciner is about 15 minutes.

The calcined trona is passed to a dissolver where it is dissolved in recycled mother liquor and sufficient additional make-up water to maintain the desired volume of solution. Although sodium carbonate is less soluble in hot solutions than cold, the dissolution rate of calcined trona in the mother liquor and water increases with temperature. A temperature of about 104 to 212° F. has been selected as the most economical, i.e., a relatively high dissolution rate with a minimum heating of solutions.

More than one dissolving vessel can be used in series to obtain a substantially saturated solution. For example, if two dissolvers in series are utilized, 20 minutes residence time in each dissolver with moderate agitation will dissolve approximately 90 percent of the soluble solids fed to the first dissolver and approximately 50 percent of the remaining undissolved soluble solids fed to the second dissolver. Carbon dioxide can be evolved during the dissolution step to maintain a material balance in the system. If desired, carbon dioxide can also be removed from the mother liquor prior to recycling into the dissolver.

The solution from the dissolvers which contains suspended insolubles is then passed to a clarifier where the insolubles settle out. To remove any insolubles which remain in suspension in the clarifier overflow, the solution is filtered. The residue from the clarifier and filter is discarded to waste.

The solution is then passed to a carbonator where the liquor is carbonated by the addition of carbon dioxide to the extent that sodium sesquicarbonate (not sodium bicarbonate) is the stable crystalline phase. During this carbonation step the solution is cooled to about 86 to 140° F. This carbonation and cooling causes precipitation of sodium sesquicarbonate crystals from the pregnant liquor. The cooling is preferably provided by recycling a portion of the solution through a cooler. Other conventional cooling means are acceptable.

From the carbonation, cooling and crystallization steps the sodium sesquicarbonate crystals and mother liquor are passed to a centrifuge where the said crystals are separated from the mother liquor. The mother liquor is recycled to the dissolver after being heated to desired temperatures for dissolution. Crude trona contains varying amounts of NaCl, $Na_2SO_4$ and other soluble impurities. As the concentrations of these build up in the recycling liquor, complex salts may crystallize out with the sodium sesquicarbonate. Purging the system by bleeding some of the recycling mother liquor to waste can be used as a means for maintaining these constituents at the desired concentration level.

The sodium sesquicarbonate crystals are passed to a calciner and heated to about 357° F. to remove water and carbon dioxide and to form sodium carbonate (soda ash).

The quantity of carbon dioxide necessary for the carbonation of the pregnant liquor can be recovered from the trona ore and the sodium sesquicarbonate calcination steps by use of any conventional means, such as separating water and impurities from the carbon dioxide-containing exhaust gases from the calciners by condensing means.

A preferred mode of operation for carrying out the described process is illustrated in the accompanying drawing. Crude trona ore is fed to a crusher 10 wherein the crude trona is crushed and passed through a screen of less than 4 mesh. The crushed and screened crude trona is passed to a calciner 11 in which the sodium sesquicarbonate in the crude trona is converted into sodium carbonate and the organic materials contained in the crude trona are burned off.

The calcined trona is then passed via line 12 to a dissolver 13 where the sodium carbonate and other solubles are dissolved in the mother liquor which is recycled via line 42. Make-up water is added to the dissolver via line 14. Carbon dioxide is removed through line 15 to maintain a material balance in the system.

The solution of sodium carbonate, other solubles and suspended insolubles, is passed to a clarifier 17 via line 16 wherein the insolubles are settled out. The clarified overflow is passed through a filter 19 via line 18 to remove any remaining suspended insolubles. The settled-out residue from the clarifier 17 is passed to a centrifuge 20 where the residue is separated from any remaining liquor. Liquor is returned to the system via line 21. The residue from centrifuge 20 and the filtered insolubles from the filter 19 are discarded to waste via line 22.

The solution from the filter 19 is passed to a carbonator 24 via line 23 where it is cooled to about 86 to 140° F. during carbonation to precipitate sodium sesquicarbonate crystals. The cooling is accomplished by recycling a portion of the solution through valve 25, cooler 26 and back to the system via line 27. A pressure relief valve 28 can be provided to prevent overpressurization of the carbonator.

Carbon dioxide for the carbonation is obtained by recycling the combustion gases from the trona ore calciner 11 via line 29 and the combustion gases from the sodium sesquicarbonate calciner 36 via line 30 through condensing means 31. The desired quantity of carbon dioxide being fed to the carbonator via line 32 is controlled by valve 33 which bleeds off unrequired carbon dioxide.

Sodium sesquicarbonate crystals and mother liquor are passed from the carbonator 24 to a centrifuge 34 where the said sodium sesquicarbonate crystals are separated from the mother liquor. The separated sodium sesquicarbonate crystals are passed from the centrifuge 34 to a calciner or dryer 36 via line 35 where water and carbon dioxide are removed to form sodium carbonate (soda ash).

The mother liquor from the centrifuge 34 is routed through valve 37 to heater 38 via lines 39 and 40. The mother liquor, after being heated to about 104 to 212° F., is then recycled to the dissolver 13 via lines 41 and 42. To limit the concentration of NaCl, $Na_2SO_4$ and other soluble impurities at an acceptable level some of the mother liquor is bled to waste by valve 43 via line 44.

With a slight modification of this invention, the carbonation and crystallization can be performed under substantially adiabatic conditions; in other words, the pregnant liquor is not cooled during the carbonation step. The trona calcination, dissolution and removal of insolubles steps are performed in a manner identical to that described in detail above. Referring to the drawing, recycling of a portion of the pregnant liquor through valve 25, cooler 26, and line 27 is deleted. The same system as illustrated could be used by merely closing valve 25. With no cooling during the carbonation step, the solution temperature will increase approximately 7° F. during the carbonation which is approximately the same as the temperature decrease during dissolution of the calcined trona in the dissolver.

Since the solution is not cooled with this modification to the invention, the mother liquor does not need to be heated before recycling to the dissolver. Referring to the drawing, the same system as illustrated could be used by recycling the mother liquor to the dissolver 13 through valve 47 via lines 39, 45, 46, and 42 with valve 37 closed.

After carbonation the separation of the crystals from the mother liquor is performed in a manner identical to that described in detail above. The calcination of the separated sodium sesquicarbonate crystals is performed in the same manner as described above.

This modification to the invention yields less sodium sesquicarbonate crystals per operating cycle because there is no cooling during the carbonation step. For example, the crop of sodium sesquicarbonate crystals will be about 11 pounds per 100 pounds of pregnant liquor with the adiabatic carbonation at a temperature of about 212° F. compared to about 20 pounds of crystals per 100 pounds of pregnant liquor if the solution is cooled to 140° F. and to about 22.8 pounds of crystals per 100 pounds of pregnant liquor if the solution is cooled to 86° F. This reduced yield per operating cycle is offset by the reduction of operating costs accruing from the elimination of the cost of cooling the solution and the elimination of the cost for reheating the recycled mother liquor. The total yield per pound of crude trona ore is not reduced significantly since the mother liquor is recycled.

EXAMPLE

For a plant producing soda ash at a rate of 350,000 tons per year according to the preferred method of this invention illustrated and described in connection with the drawing, the following conditions will apply:

Crushed and screened crude trona ore to calciner 11, lbs./hour:

| | | |
|---|---:|---:|
| $Na_2CO_3$ | 56,400 | |
| $NaHCO_3$ | 44,700 | |
| $H_2O$ | 19,100 | |
| Insolubles (primarily shale) | 11,355 | |
| NaCl | 106 | |
| $Na_2SO_4$ | 45 | |
| Organics | 475 | |
| | 132,181 | 132,181 |

Calcined trona to dissolver 13 via line 12, lbs./hour:

| | | |
|---|---:|---:|
| $Na_2CO_3$ | 83,500 | |
| $NaHCO_3$ | ----- | |
| $H_2O$ | ----- | |
| Insolubles (primarily shale) | 11,355 | |
| NaCl | 100 | |
| $Na_2SO_4$ | 44 | |
| Organics | ----- | |
| | 94,999 | 94,999 |

Make-up water as steam to dissolver 13 via line 14, lbs./hour _____ 25,396

Mother liquor from centrifuge 34 passed to dissolver via line 42, lbs./hour:

| | | |
|---|---:|---:|
| $Na_2CO_3$ | 134,000 | |
| $NaHCO_3$ | 106,000 | |
| $H_2O$ | 636,860 | |
| NaCl | 4,400 | |
| $Na_2SO_4$ | 1,800 | |
| | 883,060 | 883,060 |

Carbon dioxide evolved from dissolver 13 via line 15, lbs./hour _____ 4,400

Effluent from dissolver 13 via line 16, lbs./hour:

| | | |
|---|---:|---:|
| $Na_2CO_3$ | 228,100 | |
| $NaHCO_3$ | 89,200 | |
| $H_2O$ | 664,200 | |
| Insolubles (primarily shale) | 11,355 | |
| NaCl | 4,400 | |
| $Na_2SO_4$ | 1,800 | |
| | 999,055 | 999,055 |

Filtrate to carbonator 24 via line 23, lbs./hour:

| | | |
|---|---:|---:|
| $Na_2CO_3$ | 228,100 | |
| $NaHCO_3$ | 89,200 | |
| $H_2O$ | 664,200 | |
| NaCl | 4,400 | |
| $Na_2SO_4$ | 1,800 | |
| | 987,700 | 987,700 |

Clarifier sludge and filtered insolubles to waste via line 22, lbs./hour ____ 11,355

Carbon dioxide to carbonator 24 via line 32, lbs./hour:

$CO_2$ _____ 15,650   15,650

Sodium sesquicarbonate crystals from centrifuge 34 to calciner 36 via line 35, lbs./hour:

| | | |
|---|---:|---:|
| $Na_2CO_3$ | 56,400 | |
| $NaHCO_3$ | 44,600 | |
| $H_2O$ | 19,150 | |
| | 120,150 | 120,150 |

Mother liquor purge to waste via line 44, lbs./hour:

| | | |
|---|---:|---:|
| $Na_2CO_3$ | 3,240 | |
| $NaHCO_3$ | 2,560 | |
| $H_2O$ | 15,600 | |
| NaCl | 100 | |
| $Na_2SO_4$ | 44 | |
| | 21,544 | 21,544 |

Soda ash product, lbs./hour _____   83,500

Various modifications and alterations will become apparent to those skilled in the art without departing from the scope and spirit of this invention, and it should be understood that the latter is not necessarily limited to the aforementioned discussion.

I claim:

1. A process for producing substantially organic-free soda ash from crude trona carrying organic materials comprising:
   (a) crushing the said crude trona,
   (b) calcining the said crushed crude trona in the presence of oxygen and thereby substantially removing the said organic materials.
   (c) dissolving the substantially organic free calcined crushed crude trona by addition of water and recycle mother liquor hereinafter recited with release of $CO_2$,
   (d) removing insolubles from the solution from step (c),
   (e) carbonating the solution from step (d) with $CO_2$ in a closed carbonator with cooling and thereby precipitating sodium sesquicarbonate crystals,
   (f) separating the precipitated sodium sesquicarbonate crystals from the mother liquor of the solution from step (e),
   (g) recycling the mother liquor from step (f) to step (c),
   (h) calcining the separated sodium sesquicarbonate crystals from step (f) to soda ash,
   (i) recovering the soda ash from step (h) as a substantially organic-free soda ash product.

2. The process in claim 1 wherein said crude trona is crushed and screened to granules of about 4 to 20 mesh screen size and calcined at about 950 to 1150° F.

3. The process in claim 2 wherein the dissolving step (c) is carried out at a temperature of from about 104 to about 212° F.

4. The process in claim 3 wherein said separated sodium sesquicarbonate crystals are calcined at about 375° F.

5. The process in claim 4 wherein the $CO_2$ required for said carbonating step (e) is recovered from the crude trona and sodium sesquicarbonate calcination steps.

6. The process in claim 5 wherein step (g) includes purging to waste sufficient quantities of recycled mother liquor to prevent build up of NaCl, $Na_2SO_4$ and other soluble impurities in the system.

7. The process in claim 6 wherein the said carbonating step (e) is performed with the said solution cooled to from about 86 to about 140° F. and the recycled mother liquor is heated to maintain the dissolving step (c) at a temperature of from about 104 to about 212° F.

8. The process in claim 6 wherein the said carbonating step (e) is performed in a substantially adiabatic manner such that the said solution at step (e) is not cooled and the recycled mother liquor for step (e) is not heated.

References Cited

UNITED STATES PATENTS

| 2,346,140 | 4/1944 | Pike | 23—63 |
| 2,639,217 | 5/1953 | Pike | 23—63 |
| 2,962,348 | 11/1960 | Seglin et al. | 23—63 X |
| 3,119,655 | 1/1964 | Frint et al. | 23—63 |

OTHER REFERENCES

Hou, "Manufacture of Soda," 2nd ed., Reinhold Publishing Corp., New York, 1942, p. 258, TP 245.S7H6.

OSCAR R. VERTIZ, Primary Examiner

G. T. OZAKI, Assistant Examiner

U.S. Cl. X.R.

23—64